United States Patent [19]

Harris et al.

[11] Patent Number: 4,558,263

[45] Date of Patent: Dec. 10, 1985

[54] ALL TERRAIN VEHICLE TOY WITH DYNAMIC BRAKING

[75] Inventors: Timothy S. Harris; Lawrence R. Harrod, both of Fort Wayne, Ind.

[73] Assignee: Pines of America, Inc., Ind.

[21] Appl. No.: 558,757

[22] Filed: Dec. 6, 1983

[51] Int. Cl.$^4$ ............................................. H02P 1/16
[52] U.S. Cl. .................................. 318/139; 318/63; 318/442; 180/211
[58] Field of Search ............... 318/53, 63, 139, 442; 180/65.1, 214, 216, 211, 220; 200/61.85, 86.5, 157, 161

[56] References Cited

U.S. PATENT DOCUMENTS

| | | | |
|---|---|---|---|
| 2,482,550 | 9/1949 | Koertge et al. | 200/86.5 X |
| 2,570,319 | 10/1951 | Cassady | 180/65.1 X |
| 2,892,506 | 6/1959 | Slater | 180/65.6 X |
| 2,993,550 | 7/1961 | Klappert | 180/65.1 X |
| 3,059,716 | 10/1962 | Iserman et al. | 180/275 |
| 3,219,137 | 11/1965 | Appleton | 318/139 X |
| 3,241,019 | 3/1966 | Gross | 180/65.1 X |
| 3,564,186 | 2/1971 | Mittelstadt | 200/161 X |
| 3,818,293 | 6/1974 | Wood et al. | 180/65.1 X |
| 3,842,928 | 10/1974 | Kishi | 180/214 |
| 3,942,604 | 3/1976 | Black, III | 180/272 |
| 4,157,123 | 6/1979 | Rodaway | 318/380 X |
| 4,265,047 | 5/1981 | Meyer et al. | 446/7 |
| 4,313,517 | 2/1982 | Pivar | 180/65.2 X |
| 4,378,855 | 4/1983 | Haub et al. | 180/65.1 |

FOREIGN PATENT DOCUMENTS

| | | | |
|---|---|---|---|
| 2439210 | 8/1974 | Fed. Rep. of Germany | 180/220 |
| 2915387 | 10/1980 | Fed. Rep. of Germany | 180/214 |

Primary Examiner—William M. Shoop, Jr.
Assistant Examiner—Bentsu Ro
Attorney, Agent, or Firm—George A. Gust

[57] ABSTRACT

A childs wheeled riding toy of the three wheeled type having a front steerable wheel and a pair of rear motor driven wheels in which the child sits astride of the toy with his feet resting on opposed foot rest positions of the toy is disclosed having a pair of direct current motors, gear reduction coupled in driving relation to respective rear toy wheels and a pair of like storage batteries for powering the motors. A control circuit for selectively energizing the motors includes a switching arrangement for connecting the batteries in series and to the motors for high speed toy operation, and in parallel and to the motors for low speed operation. A second switching arrangement for disconnecting the motors from the batteries and for connecting the motors to a resistive load for dynamic braking is also included. Still further, a foot actuable dead man switching arrangement which is normally biased to an open circuit condition to preclude application of battery power to the motors is accessible to the child and operable to a closed circuit condition for enabling the motor drive arrangement.

23 Claims, 2 Drawing Figures

ALL TERRAIN VEHICLE TOY WITH DYNAMIC BRAKING

BACKGROUND OF THE INVENTION

The present invention relates generally to riding toys for children and more particularly to riding toys of the power driven variety as opposed to such toys which are self-propelled as by pedals and the like. More particularly, the present invention relates to improvements in control circuitry for such toys which are powered by rechargable storage batteries which drive dedicated direct current motors coupled to the wheels of such a toy.

Storage battery powered childrens toys including such toys which are sufficiently large to allow the child to ride in or on the toy are well known. Such toys sometimes include foot operated power switches for connecting drive motors to the battery power source and sometimes include forward-reverse switches which the child may actuate for the purpose of backing the toy rather than moving it in its normal forward direction.

Mechanical braking arrangements for childrens toys are also well known but are not commonly encountered on battery powered riding toys either because of the expense of such mechanical braking systems or the thought that such toys move at sufficiently slow speeds that no braking arrangement is necessary. Another reason for the absence of braking arrangements on small battery powered riding toys may be that the complexity of the controls would be so confusing to the child as to render them useless or undesirable.

While not having found any significant market in the area of childrens' riding toys, so called dynamic braking of electric motor powered devices is a relatively old and well developed technique. This technique has been employed in elevators and street cars and simply stated such dynamic braking amounts to a disconnecting of the electric drive motor from its power source and a shorting or shunting of the motor input leads by a comparatively small resistance so that as the object continues to turn or move, the motor is now operating as a generator into the shunting resistance and this resistance acts like a load on the generator impeding its continued rotation. Illustrative of such a dynamic braking scheme is the arrangement illustrated in an electric car, disclosed in U.S. Pat. No. 4,313,517.

In this patented arrangement, in addition to mechanical braking, the drive motor of a permanent magnet series wound type may selectively be short circuited by closure of a solenoid operated switch so that the motor acts as a generator with a load formed as the series combination of that closed switch and a resistance so as to apply a dynamic braking force to the wheel or wheels driven by that motor. The comparatively complex circuit arrangement for controlling this electric car is illustrated in FIG. 19 of the patent. The control complexity as well as the expense of such an arrangement renders it totally unsuitable for a child's toy.

SUMMARY OF THE INVENTION

Among the several objects of the present invention may be noted, the provision of an economical and readily used control arrangement for a child's riding toy; the provision of a battery powered riding toy for children characterized by its economy and ease of operation; the provision of safety features including a dead man switch arrangement as well as a braking arrangement for a power driven child's toy; and the provision of overall improvements in storage battery driven children's toys making those toys both child safe and child usable. These as well as other objects and advantageous features of the present invention will be in part apparent and in part pointed out hereinafter.

The incorporation of cost effective dynamic braking into a battery driven riding toy is achieved in the present invention by a control circuit including a pair of double pole-double throw switches one of which functions to selectively connect a pair of like batteries either in series for high speed operation of the toy or in parallel for low speed operation of the toy. The other of the double pole-double throw switches is spring biased toward a position for supplying power from the batteries to the toy drive motors and the toy includes a simple lever arrangement actuable by the child to move the second switch from its motor energizing position to a second position where the motor leads are connected to a shunting resistor for dynamic braking of the toy.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
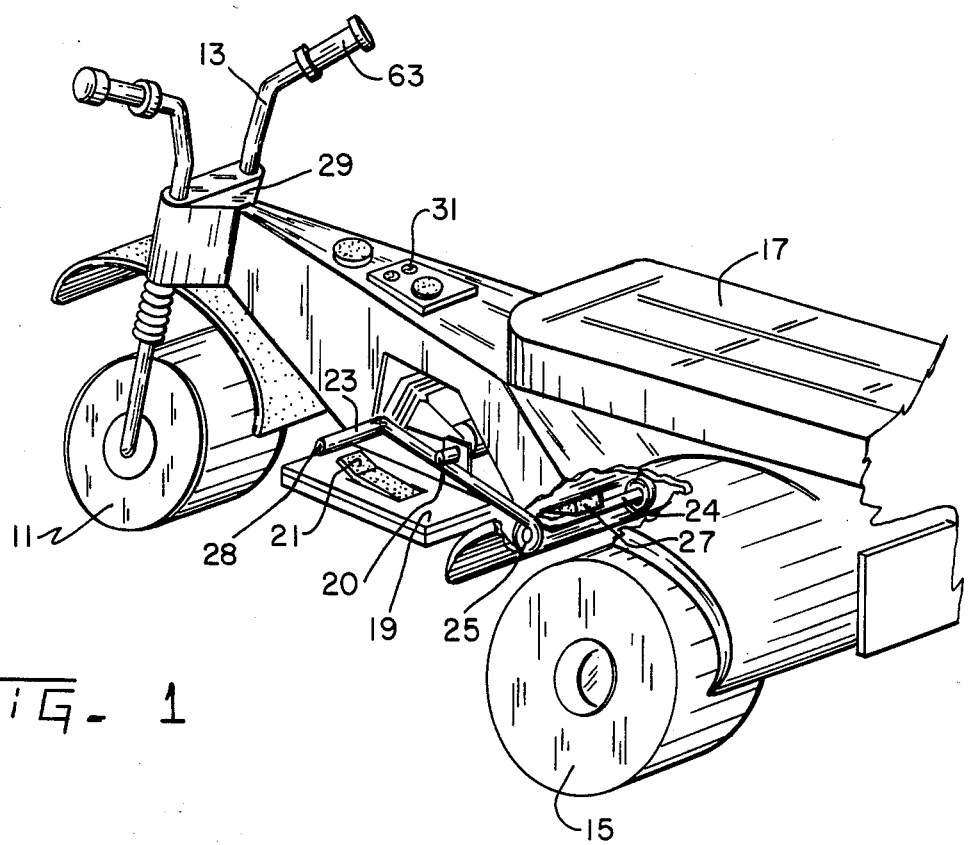
FIG. 1 is a perspective view of a three wheeled battery powered electric motor driven child's riding toy incorporating one form of the invention.

Referring first to FIG. 1, the child's toy there illustrated is of the three wheeled variety having a single front wheel 11 which may be steered by the handle bar arrangement 13 and a pair of rear wheels such as 15 each of which has a direct current motor permanently directly coupled thereto in a geared down driving relation. A child normally sits on the seat 17 astride the toy with one foot resting on the foot rest portion 19 and the other foot resting on a similar foot rest portion on the opposite side of the toy. A dead man switch pedal 21 spring biased upwardly and depressible by the child's foot may be positioned on either of the foot rest portions such as 19 to function normally to preclude application of power to the driving motors and only to allow the application of power in the event that the child depresses the pedal 21. A lever arrangement 23 pivoted at 25 and readily accessible to the child's foot may also be positioned above either one or both of the foot rest portions 19. This lever 23 is spring biased upwardly and readily depressible by the child so as to pivot about point 25 and mechanically engage a switch 27, which switch when engaged functions to disconnect the drive motors from the battery power source and to apply the dynamic braking function in a manner to be described in greater detail in conjunction with FIG. 2. Additional switches and controls discussed in conjunction with FIG. 2 may be located on the panel area 29 or in region 31 as desired.

The lever 23 has an arm portion 24 extending outwardly from pivot 25, which engages switch mechanism 27. The latter is spring biased such as to bear against arm portion 24 to swing lever 23 upwardly against stop pin 20. The forward end of lever 23 has transverse toe portion 28 which is disposed first ahead of switch pedal 21.

In operation, the child may rest the ball of his or her foot on the switch pedal 21 in such a manner as to depress it without moving the lever 23 sufficiently to operate switch mechanism 27. The transverse toe portion 28 is engaged by the child's toes while the ball of the foot rests on the switch pedal 21. If the child desires to apply the brake while the switch pedal is depressed to energize the electric motor, he or she merely depresses the toe portion 28 sufficiently to actuate switch mechanism 27. This, as explained in the following deenergizes the motors 47, 49 and applies a shunt resistor thereacross to form a dynamic brake.

Figure 2:
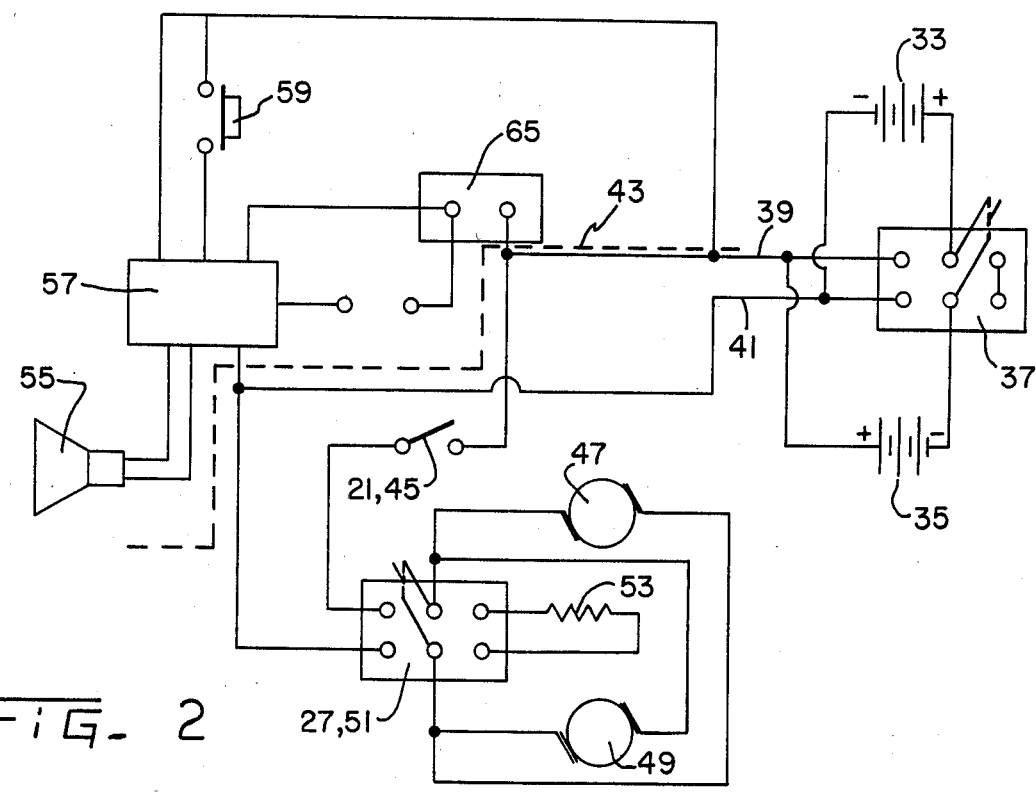
FIG. 2 is a schematic diagram of the control circuit for the toy of FIG. 1.

Turning now to FIG. 2, a pair of like capacity and voltage storage batteries 33 and 35 with polarities as shown are connected by way of a double pole-double throw switch 37 to lines 39 and 41. In one position of the double pole-double throw switch 37 the batteries 33 and 35 are connected in parallel to lines 39 and 41 while in the other switch position those batteries are connected in series to lines 39 and 41 thus providing two different voltages, one of which is half the other, for either high speed or low speed operation of the toy.

The dotted line 43 separates sound effects circuitry above and to the left of that line while the circuitry below line 43 comprises the remainder of the power drive and dynamic braking circuitry of this control system. Spring biased pedal 21 of FIG. 1 when depressed closes switch 45 to supply battery energy of a selected voltage to the pair of parallel connected, direct current drive motors 47 and 49. The switch mechanism 27 of FIG. 1 mechanically controls the double pole-double throw switch 51 which is normally biased to connect the motors 47 and 49 to the power source lines 39 and 41 by way of the closed dead man switch 45. In the event that lever 23 of FIG. 1 is depressed by the child, the double pole-double throw switch 51 changes to connect the parallel connected motors 47 and 49 in parallel with the comparatively low resistance dynamic braking resistor 53 so that the motors 47 and 49 then function as generators with resistance 53 as a load slowing the motors 47 and 49 in accordance with well known dynamic braking principles.

A loud speaker 55 is connected to a printed circuit board 57 which printed circuit board provides various sounds effects at the option of the child playing with the toy. For example, a depressible horn button 59 may cause the printed circuitry on board 57 to generate a horn sound. A switch for connecting or disconnecting the sound effects system may be provided at 65. Hand grip 63 may control the double pole-double throw switch 37 or switch 37 may be positioned on panels 29 or 31 as desired.

From the foregoing it is now apparent that a novel child's riding toy as well as a novel control circuit for a battery driven toy have been disclosed meeting the objects and advantageous features set out herein before as well as others and that modifications as to the precise configurations, shapes and details may be made by those having ordinary skill in the art without departing from the spirit of the invention or the scope thereof as set out by the claims which follow.

What is claimed is:

1. In a battery powered electric motor driven child's riding toy of the type having a pair of direct current motors directly coupled in driving relation to respective driven wheels, a control circuit for selectively energizing the motors comprising:
    a first hand actuable switch for selectively providing one of two possible battery voltages to the motors connected in parallel;
    a dead man switch which when closed forms a part of the circuit interconnecting the motors and the batteries, the dead man switch normally biased to an open circuit condition and operable to a closed circuit condition by a child on the toy;
    a second switch, serving as a run-brake switch, normally biased to its run position; and
    a foot actuable brake lever operable by a child on the toy to move the run-brake switch to its brake position, the run-brake switch when in the run position connected in circuit between the motors and the batteries, and when in the brake position opening the circuit between the motors and the batteries to preclude the supply of battery power to the motors whereby battery power can be supplied to the motors only when both the dead man switch is closed and the run-brake switch is in the run position.

2. The control circuit of claim 1 wherein the toy includes a pair of batteries with the first switch selectively providing series and parallel interconnection of the batteries.

3. The control circuit of claim 1 wherein the brake lever comprises a foot actuable pivotable lever with one end thereof readily accessible for depression by a child on the toy and another portion thereof for actuating the second switch.

4. The control circuit of claim 1 wherein the second switch is effective in its run position to connect the motors in parallel with one another and to a source of battery power and in its brake position to connect the motors in parallel to a relatively low resistance load to achieve dynamic braking of the motors.

5. The control circuit of claim 1 further comprising sound effects circuit means, connected to the first switch for receiving the selected one of the two possible voltages upon child actuation, for providing sound effects commensurate with the selected one of the two possible voltages operating the toy.

6. The control circuit of claim 5 wherein the sound effects include the sounding of a horn and artificial variable pitch engine sounds.

7. The control circuit of claim 6 further comprising a mock throttle control coupled to the sound effects circuit means for controlling the pitch of the artificial engine sound.

8. The control circuit of claim 1, wherein the first hand actuable switch comprises a double pole-double throw switch.

9. The control circuit of claim 1, wherein the dead mean switch is foot actuable by a child on the toy.

10. The control circuit of claim 1, wherein the second switch comprises a double pole-double throw switch.

11. A wheeled riding toy for a child having a pair of direct current motors gear reduction coupled in driving relation permanently to respective toy wheels, a pair of like storage batteries, first means for connecting the batteries in series and to the motors for high speed toy operation and in parallel and to the motors for low speed operation, second means for disconnecting the motors from the batteries and connecting the motors to a resistive load for dynamic braking of the toy, the second means normally biased to interconnect the motors and batteries, a foot actuable dead man switch normally biased to an open circuit condition to preclude application of battery power to the motors and operable to a closed circuit condition by a child on the toy, the second means including a foot actuable lever accessible to a child on the toy for overriding the second means biased to achieve dynamic braking, said lever being adjacent to said dead man switch and engageable by the child's toes while the ball of the foot is operably engaged with the dead man switch, said vehicle being provided with a foot rest, said dead man switch being carried by said foot rest and said lever being mounted in overlying relation to said foot rest and further mounted on said vehicle for verticle movement about a horizontal pivot, said lever having two arms extending generally oppositely from said pivot, one arm overlying said foot rest and having a transverse toe portion adjacent to and above said dead man switch, the other arm being engaged by said double pole-double throw switch so as to be actuated thereby upon moving said toe portion of said lever downwardly.

12. The toy of claim 11 wherein the first means comprises a double pole-double throw switch.

13. The toy of claim 11 wherein the second means comprises a double pole-double throw switch normally biased toward the position for connecting the batteries to the motor.

14. The wheeled riding toy of claim 11, wherein said dead man switch is foot actuable.

15. The wheeled riding toy of claim 14 wherein said dead mean switch is carried by said foot rest adjacent said lever so as to have said transverse toe portion of said lever adjacent to and above said dead man switch, the dead man switch thereby being operably engageable by the ball of the child's foot while the child's toes of said foot are operably engaged with said transverse toe portion of said lever.

16. A wheeled riding toy for a child comprising:
direct current motor means gear reduction coupled in driving relation to respective toy wheels;
storage battery means;
first means for connecting the storage battery means to the direct current motor means for toy operation, said first means including a hand grip controllable switch;
and second means for disconnecting the motor means from the battery means and connecting the motor means to a resistive load for dynamic braking of the toy, said second means including a run-brake switch normally biased to connect the battery means to the motor means and a foot depressible pivotally mounted lever arrangement readily accessible to a child's foot to be depressed actuating the run-brake switch from its normal position to dynamically brake the toy.

17. The toy of claim 16 wherein the run-brake switch is mounted on an exposed undersurface of the toy.

18. A wheeled riding toy for a child comprising:
direct current motor means gear reduction coupled in driving relation to respective toy wheels;
storage battery means;
first means for connecting the storage battery means to the direct current motor means for toy operation; and second means for disconnecting the motor means from the battery means and connecting the motor means to a resistive load for dynamic braking of the toy, the second means including lever arrangement pivotally mounted for limited rotation about an axis extending generally transversely of the toy with an end portion extending forwardly from the pivot axis, said end portion including a transverse toe portion accessible for depression by a child, and said lever arrangement further having an arm portion extending rearwardly from the pivot axis and then transversely generally parallel to the pivot axis to engage said second means, the second means further includes a switch normally connecting the battery means to the motor means mounted on an exposed undersurface of the toy and engageable by the transverse portion of the rearwardly extending arm portion so that depression of the transverse toe portion of the lever arrangement causes the transverse portion of the rearwardly extending arm portion to mechanically engage the switch, moving that switch from its normal position to dynamically brake the toy.

19. A wheeled riding toy for a child comprising:
a pair of direct current motors gear reduction coupled in driving relation to respective toy wheels;
a pair of like storage batteries;
first means for connecting the batteries in series and to the motors in parallel with each other for high speed toy operation and in parallel and to the motors in parallel with each other for low speed toy operation, the first means including a switch normally biased to an open circuit condition to preclude application of battery power to the motors and manually operable to a closed circuit condition by a child on the toy, the switch remaining in the closed circuit condition only as long as it is held there by the child and
second means for disconnecting the motors from the batteries and connecting the motors to a resistive load for dynamic braking of the toy, the second means comprising a switch normally biased toward a position for connecting the batteries to the motor and further including a foot actuable lever accessible to a child on the toy for overriding the second means bias and moving the switch to a position to achieve dynamic braking.

20. A wheeled riding toy for a child comprising:
direct current motor means gear reduction coupled in driving relation to respective toy wheels;
storage battery means;
first means for connecting the storage battery means to the direct current motor means for toy operation; and
second means for disconnecting the motor means from the battery means and connecting the motor means to a resistive load for dynamic braking of the toy, the second means including lever arrangement pivotally mounted for limited rotation about an axis extending generally transversely of the toy with an end portion extending forwardly from the pivot axis, said end portion including a transverse toe portion accessible for depression by a child, and said lever arrangement further having an arm portion extending rearwardly from the pivot axis and then transversely generally parallel to the pivot axis to engage said second means.

21. A wheeled riding toy for a child having direct current motor means gear reduction coupled in driving relation permanently to respective toy wheels;

storage battery means; first means for connecting the storage battery means to the direct current motor means for toy operation;

and second means for disconnecting the motor means from the battery means and connecting the motor means to a resistive load for dynamic braking of the toy, the second means comprising a switch mounted on an exposed under surface of the toy normally connecting the battery means to the motor means and a foot depressable pivotally mounted lever arrangement biased upwardly and readily accessible to a child's foot to be depressed against the bias to mechanically engage the switch, moving that switch from its normal position to dynamically brake the toy, the lever arrangement including a lever pivotally mounted for limited rotation about an axis extending generally transversely of the toy, the lever including an end portion extending forwardly from the pivot axis and accessible for depression by a child and an arm portion extending rearwardly from the pivot axis and transversely beneath the exposed undersurface of the toy with the rearwardly extending arm portion engaging and actuating the switch when the forwardly extending end portion is depressed.

22. The toy of claim 21 further comprising stop means for selectively engaging and limiting upward movement of the lever forward end.

23. The toy of claim 21 wherein the lever forward end includes a transversely extending toe portion foot depressible by a child riding the toy.

* * * * *